(12) United States Patent
Nakatani et al.

(10) Patent No.: US 8,519,828 B2
(45) Date of Patent: Aug. 27, 2013

(54) PNEUMATIC FENDER MANAGEMENT SYSTEM

(75) Inventors: Koji Nakatani, Hiratsuka (JP); Michito Kaneko, Hiratsuka (JP); Sigeki Sakakibara, Hiratsuka (JP); Syuu Yamada, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/702,924

(22) PCT Filed: Apr. 19, 2011

(86) PCT No.: PCT/JP2011/059648
§ 371 (c)(1),
(2), (4) Date: Dec. 7, 2012

(87) PCT Pub. No.: WO2011/155265
PCT Pub. Date: Dec. 15, 2011

(65) Prior Publication Data
US 2013/0076536 A1    Mar. 28, 2013

(30) Foreign Application Priority Data
Jun. 11, 2010   (JP) .................................. 2010-134105

(51) Int. Cl.
*H04Q 5/22*   (2006.01)

(52) U.S. Cl.
USPC ........ 340/10.5; 340/3.1; 340/5.1; 340/870.01

(58) Field of Classification Search
USPC .................. 340/870.01, 984, 870.06, 870.07, 340/870.16, 505, 531, 3.1, 5.1, 10.5
See application file for complete search history.

(56) References Cited

U.S. PATENT DOCUMENTS 6,448,903 B1   9/2002   Hattori
6,486,800 B1   11/2002  Hattori

FOREIGN PATENT DOCUMENTS

| JP | S60-046438 A | 3/1985 |
| JP | H9-318478 A | 12/1997 |
| WO | WO-99/20845 A1 | 4/1999 |

OTHER PUBLICATIONS

International Search Report of corresponding International Application No. PCT/JP2011/059648, dated on May 24, 2011.
ISO17357 "Ships and marine technology—High-pressure floating pneumatic rubber fenders", dated Nov. 15, 2002.

*Primary Examiner* — Albert Wong
(74) *Attorney, Agent, or Firm* — Global IP Counselors, LLP

(57) ABSTRACT

A pneumatic fender management system that establishes a correspondence between a pneumatic fender in which an identification tag recording first identification information is embedded and a pressure sensor detecting a pneumatic pressure of the pneumatic fender and transmitting a detected value. The pressure sensor includes a sensor part detecting a pneumatic pressure of the pneumatic fender, a transmission part transmitting a signal from the sensor part; a reader part reading the information in the identification tag, and a control part having a memory part recording second identification information. The control part compares the first identification information read by the reader part with the second identification information in the memory part, and if the compared information is identical, causes the transmission part to transmit the pneumatic pressure information detected by the sensor part, and if the compared information is different, stops the sensor part and/or the transmission part.

16 Claims, 2 Drawing Sheets

PNEUMATIC FENDER MANAGEMENT SYSTEM

CROSS-REFERENCE TO RELATED APPLICATIONS

This U.S. National stage application claims priority under 35 U.S.C. §119(a) to Japanese Patent Application No. 2010-134105, filed in Japan on Jun. 11, 2010, the entire contents of Japanese Patent Application No. 2010-134105 are hereby incorporated herein by reference.

BACKGROUND

1. Field of the Invention

The invention relates to a pneumatic fender management system, more specifically, a pneumatic fender management system which, if a pressure sensor is attached later to a pneumatic fender, establishes a reliable and ready correspondence between the two components, and provides safety ensuring even though an inappropriate pressure sensor is attached to the pneumatic fender.

2. Background Information

Conventionally, in mooring a ship at a quay or mooring ships alongside, a pneumatic fender is mounted on a quay wall or a side of a ship, for preventing damage to the ship body and the quay wall. The pneumatic fender is formed by charging compressed air into an approximately barrel-shaped hollow structure made of an elastic material such as rubber to buffer impact in mooring a ship at a quay or mooring ships alongside by pneumatic pressure. Accordingly, it is needed that the pneumatic fender is configured so as to be capable of being checked if a proper pneumatic pressure is constantly maintained therein.

For example, JP-A-60-46438 suggests an inner pressure detection device in which a pneumatic pressure is detected by a pressure sensor attached to the inside of a pneumatic fender, and a detected value is constantly transmitted in a wireless manner to the outside and displayed on a receiver.

In recent years, mainly from the viewpoint of quality control and safety ensuring, there has been demand that each individual pneumatic fender is provided with an identification system for ready identification of the pneumatic fender (see ISO17357 entitled "Ships and marine technology—High-pressure floating pneumatic rubber fenders"). Accordingly, when each individual pneumatic fender can be identified, it is possible to control a pneumatic pressure more accurately by attaching a pressure sensor suitable for specifications of the pneumatic fender.

However, setting aside the case where a pressure sensor is attached to a pneumatic fender at the time of manufacture, if a pressure sensor is attached later to an existing pneumatic fender or a pressure sensor is replaced, there is the possibility that an inappropriate pressure sensor is attached to the pneumatic fender. At occurrence of such a situation, no appropriate feedback may be provided to a user due to malfunction of the pressure sensor, which leads to damage to the ship due to excessive compression of the pneumatic fender, burst of the pneumatic fender due to excessive air supply, and the like. Accordingly, it is desired to realize a management system which establishes a reliable and ready correspondence between a pneumatic fender and a pressure sensor and provides safety ensuring.

SUMMARY

An object of the present invention is to provide a pneumatic fender management system which, if a pressure sensor is attached later to a pneumatic fender, establishes a reliable and ready correspondence between the two components, and provides safety ensuring even though an inappropriate pressure sensor is attached to the pneumatic fender.

To attain the foregoing object, a pneumatic fender management system in a first invention is a pneumatic fender management system that establishes a correspondence between a pneumatic fender in which an identification tag recording first identification information is embedded and a pressure sensor detecting a pneumatic pressure of the pneumatic fender and transmitting a detected value, wherein the pressure sensor includes: a sensor part detecting a pneumatic pressure of the pneumatic fender; a transmission part transmitting a signal from the sensor part; a reader part reading the information in the identification tag; and a control part having a memory part recording second identification information, the control part compares the first identification information read by the reader part with the second identification information in the memory part, and if the compared information is identical, causes the transmission part to transmit the pneumatic pressure information detected by the sensor part, and if the compared information is different, stops the sensor part and/or the transmission part.

To attain the foregoing object, a pneumatic fender management system in a second invention is a pneumatic fender management system that establishes a correspondence between a pneumatic fender in which an identification tag recording first identification information is embedded and a pressure sensor that detects a pneumatic pressure of the pneumatic fender and transmits a detected value, and is activated by a wireless activation device, wherein the pressure sensor includes a sensor part detecting a pneumatic pressure of the pneumatic fender and a transmission part transmitting a signal from the sensor part, the wireless activation device includes a reader part reading the information of the identification tag and a control part having a memory part recording second identification information, the control part compares the first identification information read by the reader part with the second identification information in the memory part, and only if the compared information is identical, causes a wireless signal for activating the pressure sensor to be transmitted.

According to the pneumatic fender management system in the first invention, if the pressure sensor is attached later to the pneumatic fender, the identification information in the identification tags provided in the pneumatic fender and the pressure sensor is compared to establish a correspondence between the pneumatic fender and the pressure sensor, and if the compared identification information is different, the pressure sensor is deactivated. Accordingly, it is possible to realize a reliable and ready correspondence between the pneumatic fender and the pressure sensor and provide safety ensuring even though an inappropriate sensor is attached.

According to the pneumatic fender management system in the second invention, in addition to the foregoing advantages, it is possible to decrease the parts count of the pressure sensor to achieve cost reduction.

In the first and second inventions, the sensor part and the transmission part are desirably formed by a tire pressure monitoring system for automobile. Using such a commercialized product makes it possible to achieve further cost reduction.

The sensor part is desirably provided with a temperature sensor measuring an internal temperature of the pneumatic fender. This makes it possible to comprehend the integrity of the pneumatic fender with high accuracy.

The identification tag uses an RFID tag. Using such a commercialized product makes it possible to achieve further cost reduction.

DETAILED DESCRIPTION

An embodiment of the invention will be described with reference to the drawings.

Figure 1:
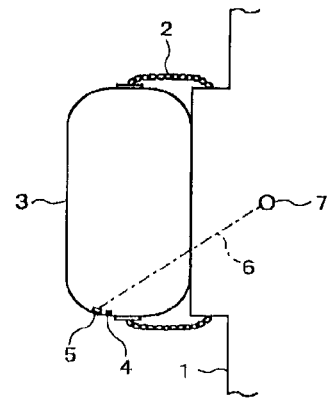
FIG. 1 is a diagram showing an example of a pneumatic fender to be managed by a pneumatic fender management system in a disclosed embodiment.

FIG. 1 is a diagram showing an example of a pneumatic fender to be managed by a pneumatic fender management system in a first embodiment.

The pneumatic fender management system (hereinafter, called simply "management system") includes an identification tag 4 embedded in a pneumatic fender 3 moored to a quay wall 1 by a mooring cable 2; a pressure sensor 5 attached later to an inside of the pneumatic fender 3; and a receiver 7 on shore receiving and displaying a pneumatic pressure detection signal transmitted via a radio wave 6 from the pressure sensor 5.

Figure 2:
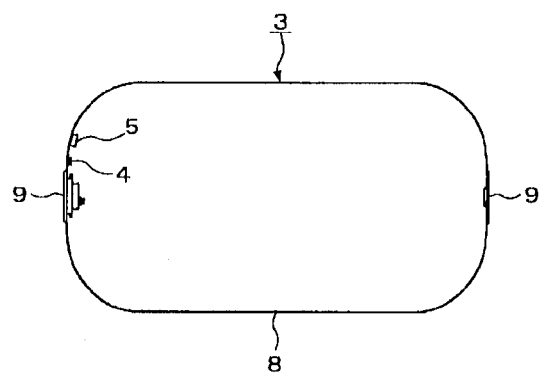
FIG. 2 is a cross section view of the pneumatic fender shown in FIG. 1.

As shown in FIG. 2, the pneumatic fender 3 has an approximately barrel-shaped hollow-structured fender main body 8 formed by laminating a rubber member and a reinforcement member, and has caps 9 with air valves or the like attached at both ends thereof.

The identification tag 4 embedded in the reinforcement layer or the like of the pneumatic fender 3 records identification information (first identification information) of the individual pneumatic fender 3. The identification tag 4 uses an RFID (Radio Frequency Identification) tag. Although there is no particular limit on the kind of the tag, the passive RFID tag is preferably used from the standpoint of unnecessity of a power source and excellence in communication performance and communication quality. In addition, the identification information defines the size, manufacturer, and serial number, and the like of the pneumatic fender 3 (see Non-patent Document 1).

Figure 3:
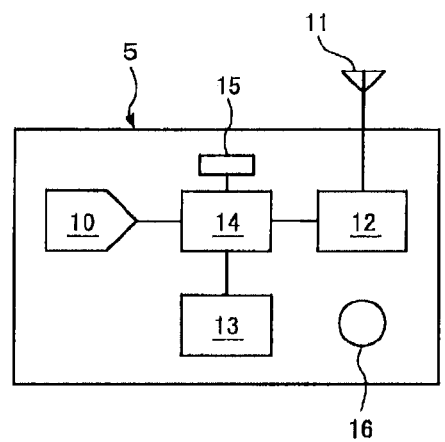
FIG. 3 is a block diagram showing a configuration of a pressure sensor shown in FIG. 1.

As shown in FIG. 3, the pressure sensor 5 attached later to the inside of the pneumatic fender 3 includes not only the sensor part 10 detecting a pneumatic pressure and the transmission part 12 transmitting the radio wave 6 to the receiver 7 via a transmission antenna 11, but also a reader part 13 reading an identification signal having the first identification information transmitted from the identification tag 4; and a control part 14 controlling operations of the sensor part 10, transmission part 12, and reader part 13. In addition, the control part 14 is provided with a memory part 15 recording identification information (second identification information) of the pneumatic fender 3 to which the pressure sensor 5 is to be attached. The sensor part 10, the control part 14, and the like are driven by a built-in power source (battery) 16. The sensor part 10 detects a pneumatic pressure by measuring a pneumatic pressure or detecting a pressure difference.

The case where the pressure sensor 5 is attached later to the pneumatic fender 3 in the foregoing management system will be described below.

Figure 6:
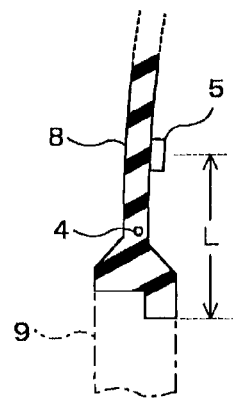
FIG. 6 is a partial cross section showing an example of an attachment position of the pressure sensor.

First, the pressure sensor 5 is attached to the inside of the pneumatic fender 3. A plurality of pressure sensors 5 may be provided preferably on rear surfaces of the caps 9 or on a neighboring inner wall of the caps 9, in terms of facilitation of maintenance and assurance of detection accuracy. For example, as shown in FIG. 6, the pressure sensor 5 may be positioned at a distance L of 300 to 350 mm from a fitting part between the fender main body 8 and the cap 9.

Next, the power source 16 of the pressure sensor 5 is turned on to activate the respective parts. The means for turning on the power source 16 is generally a wireless activation device 17 described later, but is not limited to this, and may use a timer or change in pressure of the pneumatic fender, for example.

The activated control part 14 compares the first identification information of the identification tag 4 read by the reader part 13 with the second identification information of the memory part 15. For example, if the serial numbers are identical, the sensor part 10 and the transmission part 12 are continuously operated, and a signal having the pneumatic pressure information detected by the sensor part 10 is transmitted from the transmission part 12 to the receiver 7. However, if the serial numbers are different, the sensor part 10 and/or the transmission part 12 are stopped so as not to perform any more operations related to pneumatic pressure detection.

By configuring the management system in a manner as described above, if the pressure sensor 5 is attached later to the pneumatic fender 3, the first identification information of the identification tag 4 is compared with the second identification information possessed by the pressure sensor 5, whereby it is possible to establish a reliable and ready correspondence between the pneumatic fender 3 and the pressure sensor 5. In addition, even though the inappropriate pressure sensor 5 is attached by mistake, it is possible to deactivate the pressure sensor 5 and confirm the inappropriateness via the receiver 7, which prevents damage to the ship, burst of the pneumatic fender 3, and the like.

Figure 4:
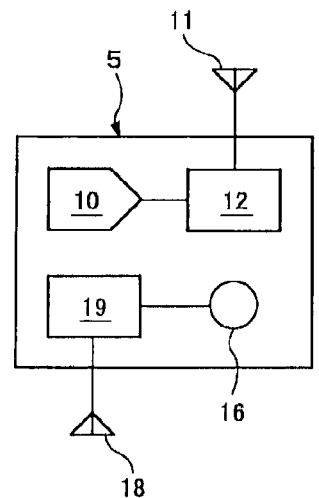
FIG. 4 is a block diagram showing a configuration of a pressure sensor in a pneumatic fender management system in another disclosed embodiment.
Figure 5:
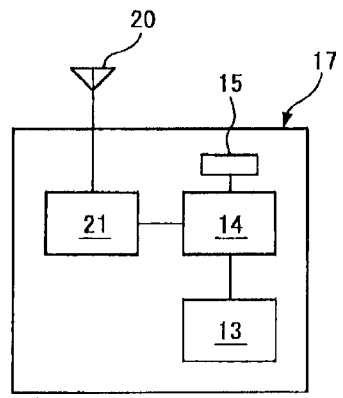
FIG. 5 is a block diagram showing a configuration of an activation device.

FIGS. 4 and 5 are diagrams showing configurations of the pressure sensor and the activation device for use in a pneumatic fender management system in an embodiment of the second invention. Components in the embodiment of the second invention having the same functions as those in the embodiment of the first invention, are given the same reference numerals as those in the embodiment of the first invention.

In the management system, the pressure sensor 5 is powered on by the activation device 17. The pressure sensor 5 has a reception part 19 receiving an activation signal from the activation device 17 via a reception antenna 18, whereas the activation device 17 includes a transmission part 21 transmitting an activation signal via an transmission antenna 20, and the reader part 13, the control part 14, and the memory part 15.

In the foregoing management system, if the pressure sensor 5 is to be attached later to the pneumatic fender 3, when the pressure sensor 5 is attached to the inside of the pneumatic fender 3 and then is activated by the activation device 17, the control part 14 causes the transmission part 21 to transmit an activation signal for turning on the power source 16 of the pressure sensor 5 to the pressure sensor 5, only if the first identification information of the identification tag 4 read by the reader part 13 is identical to the second identification information in the memory part 15.

By configuring the management system in a manner as described above, it is possible to provide the same advantages as those of the management system in the first invention and reduce the parts count of the pressure sensor 5 to achieve cost reduction.

The sensor part 10 and the transmission part 12 of the pressure sensor 5 may use a tire pressure monitoring system (hereinafter, called "TPMS") for automobile, as disclosed in JP-A 2007-083911, for example. Using the TPMS as a commercialized product makes it possible to reduce manufacturing costs of the pressure sensor 5.

In addition, a temperature sensor may be added to the sensor part 10 of the pressure sensor 5 so as to transmit a measurement signal of the temperature sensor from the transmission part. This makes it possible to comprehend the integrity of the pneumatic fender 3 with high accuracy.

The invention claimed is:

1. A pneumatic fender management system comprising:
a pressure sensor including a sensor part configured to detect a pneumatic pressure of a pneumatic fender in which an identification tag recording first identification information is embedded, a transmission part configured to transmit a signal from the sensor part, a reader part configured to read the information in the identification tag, and a control part having a memory part configured to record second identification information, and
the control part being configured to compare the first identification information read by the reader part with the second identification information in the memory part, and if the compared information is identical, cause the transmission part to transmit the pneumatic pressure information detected by the sensor part, and if the compared information is different, stop at least one of the sensor part and the transmission part.

2. A pneumatic fender management system comprising:
a pressure sensor including a sensor part configured to detect a pneumatic pressure of a pneumatic fender in which an identification tag recording first identification information is embedded, and a transmission part configured to transmit a signal from the sensor part, and
a wireless activation device including a reader part configured to read the first identification information in the identification tag, and a control part having a memory part configured to record second identification information,
the control part being configured to compare the first identification information read by the reader part with the second identification information in the memory part, and only if the compared information is identical, cause a wireless signal for activating the pressure sensor to be transmitted.

3. The pneumatic fender management system according to claim 1, wherein the sensor part and the transmission part are configured for use with an automobile.

4. The pneumatic fender management system according to claim 1, wherein the sensor part is provided with a temperature sensor configured to measure an internal temperature of the pneumatic fender.

5. The pneumatic fender management system according to claim 1, wherein the identification tag uses an RFID tag.

6. The pneumatic fender management system according to claim 3, wherein the sensor part is provided with a temperature sensor configured to measure an internal temperature of the pneumatic fender.

7. The pneumatic fender management system according to claim 3, wherein the identification tag uses an RFID tag.

8. The pneumatic fender management system according to claim 4, wherein the identification tag uses an RFID tag.

9. The pneumatic fender management system according to claim 6, wherein the identification tag uses an RFID tag.

10. The pneumatic fender management system according to claim 2, wherein the sensor part and the transmission part are configured for use with an automobile.

11. The pneumatic fender management system according to claim 2, wherein the sensor part is provided with a temperature sensor configured to measure an internal temperature of the pneumatic fender.

12. The pneumatic fender management system according to claim 2, wherein the identification tag uses an RFID tag.

13. The pneumatic fender management system according to claim 10, wherein the sensor part is provided with a temperature sensor configured to measure an internal temperature of the pneumatic fender.

14. The pneumatic fender management system according to claim 10, wherein the identification tag uses an RFID tag.

15. The pneumatic fender management system according to claim 11, wherein the identification tag uses an RFID tag.

16. The pneumatic fender management system according to claim 13, wherein the identification tag uses an RFID tag.

* * * * *